United States Patent
Harada et al.

[11] Patent Number: 5,983,484
[45] Date of Patent: Nov. 16, 1999

[54] METHOD OF MAKING AN ELECTRIC MOTOR

[75] Inventors: Yoshihiko Harada, Kosai; Masashi Nakata, Toyohashi; Akio Oshiro; Seiichi Murakami, both of Hamamatsu, all of Japan

[73] Assignee: ASMO Co., Ltd., Kosai, Japan

[21] Appl. No.: 08/822,135

[22] Filed: Mar. 17, 1997

Related U.S. Application Data

[62] Division of application No. 08/459,428, Jun. 2, 1995, Pat. No. 5,747,901.

[30] Foreign Application Priority Data

Oct. 12, 1994 [JP] Japan .................................. 6-272862

[51] Int. Cl.⁶ .......................... H02K 15/00; H01R 43/04
[52] U.S. Cl. ......................... 29/596; 29/863; 219/85.16; 310/71; 310/89; 310/83
[58] Field of Search ................... 310/71, 89, 83, 310/51, 64, 58; 29/596, 863, 857, 564.5, 753; 219/85.16, 78.01

[56] References Cited

U.S. PATENT DOCUMENTS

| | | | |
|---|---|---|---|
| 4,283,840 | 8/1981 | Merikallio et al. ................... | 29/596 |
| 4,472,693 | 9/1984 | Uemura et al. ...................... | 333/167 |
| 4,614,886 | 9/1986 | Schneider et al. .................... | 310/83 |
| 4,656,336 | 4/1987 | Goodey ............................. | 219/85.16 |
| 4,713,568 | 12/1987 | Adam et al. ....................... | 310/112 |
| 4,891,496 | 1/1990 | Zimmer ............................ | 219/85.16 |
| 5,025,184 | 6/1991 | Sekine et al. ...................... | 310/71 |
| 5,140,207 | 8/1992 | Baumeister et al. .................. | 310/83 |
| 5,194,769 | 3/1993 | Ade et al. ......................... | 310/51 |
| 5,204,565 | 4/1993 | Sekine et al. ...................... | 310/71 |
| 5,218,255 | 6/1993 | Horiguchi .......................... | 310/71 |
| 5,314,351 | 5/1994 | Yamamoto ......................... | 439/407 |
| 5,414,926 | 5/1995 | Ito et al. .......................... | 29/863 |
| 5,453,649 | 9/1995 | Blanchet ........................... | 310/71 |
| 5,504,296 | 4/1996 | Sato et al. ........................ | 219/85.16 |
| 5,573,430 | 11/1996 | Hatagishi ......................... | 439/701 |
| 5,660,742 | 8/1997 | Warner et al. ..................... | 219/85.16 |

*Primary Examiner*—Lee Young
*Assistant Examiner*—A. Dexter Tugbang
*Attorney, Agent, or Firm*—Oblon, Spivak, McClelland, Maier & Neustadt, P.C.

[57] ABSTRACT

A method of making an electric motor where the motor has a reduction gear and a gear cover mounted thereon. An opening is formed through the gear cover at a location corresponding to a connection portion. A pressure member is inserted into the gear cover through the opening and is pressed against another pressure member to squeeze a choke coil and a connection plate. High current may flow through the pressure members for a short time to weld the choke coil and the connection plate together by way of resistive heating.

10 Claims, 9 Drawing Sheets

METHOD OF MAKING AN ELECTRIC MOTOR

This is a Division of application Ser. No. 08/459,428 filed on Jun. 2, 1995 U.S. Pat. No. 5,747,901.

BACKGROUND OF THE INVENTION

1. Field of the Invention

The present invention relates to a method of making an electric motor.

2. Description of the Related Art

It is known to connect an electric motor to a coil, capacitor or the like for avoiding noises which are produced by sparks between the brush and the commutator in the motor. It is also known that an electric part such as a coil or capacitor or connection terminal is mounted in a receiving case on the housing of the electric motor.

It is further general that the electric parts are mounted in the receiving case after they have been connected to one another through leads.

However, the leads connecting the electric parts tend to be bent when the electric parts are mounted in the receiving case. The electric parts must be mounted in the case while individually holding them. Such a manual procedure is not suitable for automation.

Alternatively, the electric parts may be connected to one another through metal plates in place of the leads to hold them as a unit, as disclosed by Japanese Patent Laid-Open No. Hei 4-501650. However, the latter is disadvantageous in that the electric parts cannot be housed within the receiving case if the metal plates are not accurately positioned and preset relative to the electric parts. It was further difficult to connect the metal plates to the electric parts after they have been disposed within the receiving case.

This is because if the metal plates and electric parts are located within the receiving case providing its smaller space, it is very difficult to clamp and fix the connections between the metal plates and electric parts when they are to be connected to one another.

SUMMARY OF THE INVENTION

The object of the invention is to provide a method of making an electric motor in a way that electric parts can be simply connected to one another. The method is suitable for automation of making the electric motor by way of the easy connection of electric parts.

To this end, the present invention provides a method of making an electric motor including a reduction gear and a gear cover detachably mounted thereon, comprising steps of forming a receiving portion for receiving an electric part and a connection plate electrically connected to said electric part on the outer side of the gear cover, said connection plate having a connection portion to said electric part, forming an opening through said gear cover at a location corresponding to the connection between said electric part and said connection plate, inserting one pressure member into said gear cover through said opening, urging said one pressure member against another pressure member to squeeze said connection portion and connect said electric part to said connection plate.

According to the present invention, one pressure member is inserted into the gear cover through the opening to squeeze the connection portion in the connection plate to connect the electric part with the connection plate. Since the electric part and connection plate are connected to each other after they are received within the receiving portion, any strict position adjustment is not required, unlike the prior art wherein they are housed within the receiving portion after being connected. This is suitable for automation. Since the connection portion is squeezed by the pressure members, the electrical connection area between the connection plate and the electric part can be increased to provide an improved conductivity.

It is preferred that a pair of said pressure members are used as electrodes through which an electric current is flowed for a given time period to heat said electric part and said connection plate through resistive heating.

Since pressure and heat are applied to the electric part and connection plate according to the present invention, the electric part and connection plate can easily be squeezed together through heat to increase the contact area therebetween. The electric connection can be improved.

It is further preferred that said electric part and said connection plate are welded together through said resistive heating.

According to the present invention, the conductivity can be improved with increase of the connectivity since the electric part and connection plate are welded to each other.

It is preferred that a plurality of said connection portions are provided and said opening is formed widely at a position corresponding to said connection portions and wherein a pair of said pressure members are provided to squeeze said connection portions at the same time and connect said electric part to said connection plate.

According to the present invention, a plurality of connection portions can be simultaneously formed through one connection procedure. More particularly, opening is formed through the gear cover at a position corresponding to a plurality of connection portions. The pressure members can simultaneously squeeze a plurality of connection portions through one connection procedure.

It is further preferred that said connection plate has a holding portion for temporarily holding an electric part prior to squeezing and said connection portion is squeezed after said electric part has been held by said holding portion.

When the electric part is held by the holding portion in the connection plate, the electric part will not easily disconnect from the connection plate. Therefore, the pressurization by the pressure members can be simply and easily carried out. This is more suitable for automation.

BRIEF DESCRIPTION OF THE DRAWINGS

The invention is described in detail with reference to the following drawings, wherein.

DETAILED DESCRIPTION OF THE PREFERRED EMBODIMENTS

The present invention will now be described by way of example with reference to the drawings.

Figure 1:
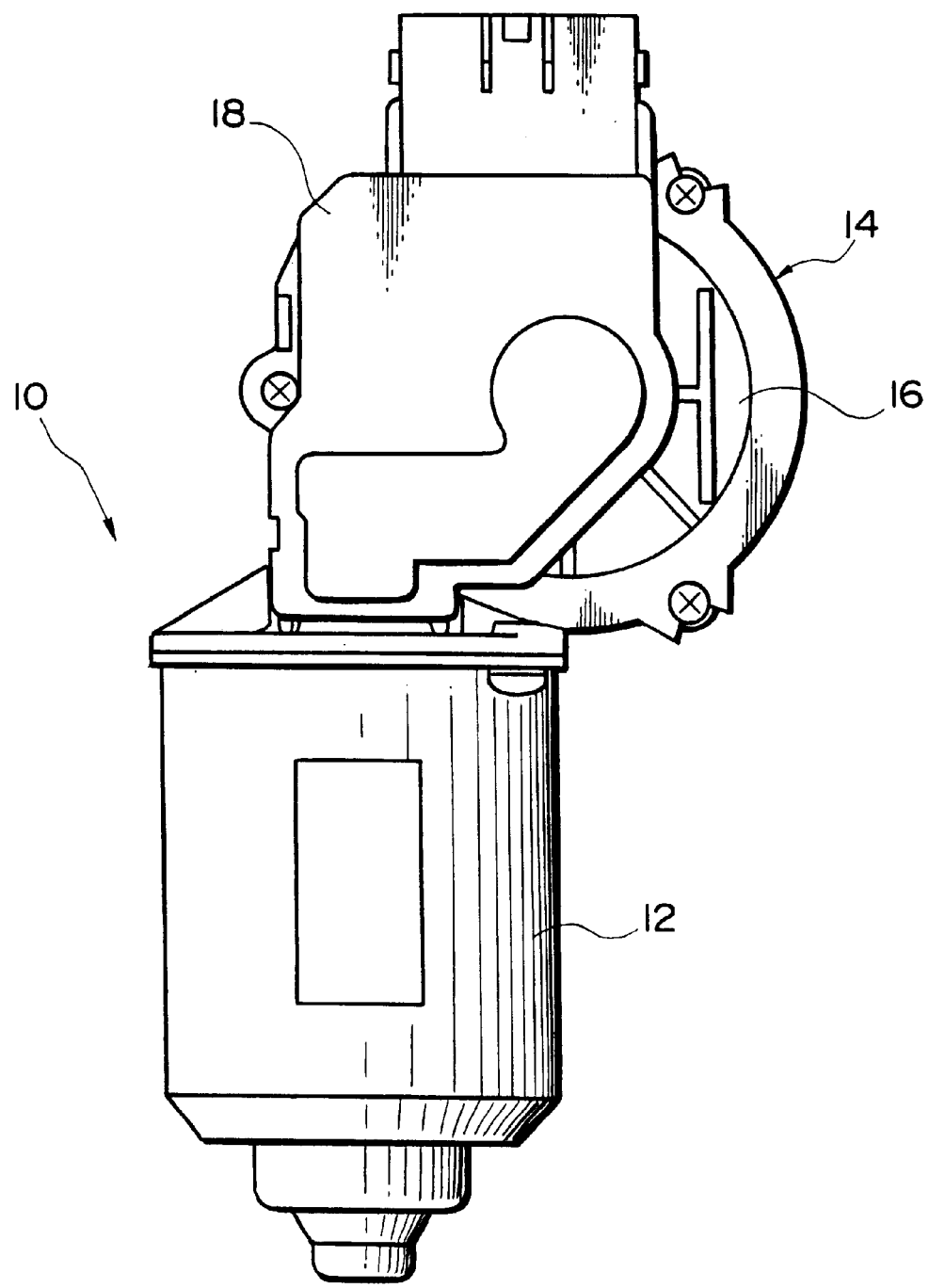
FIG. 1 is a plan view of one embodiment of an electric motor constructed in accordance with the present invention.
Figure 2:
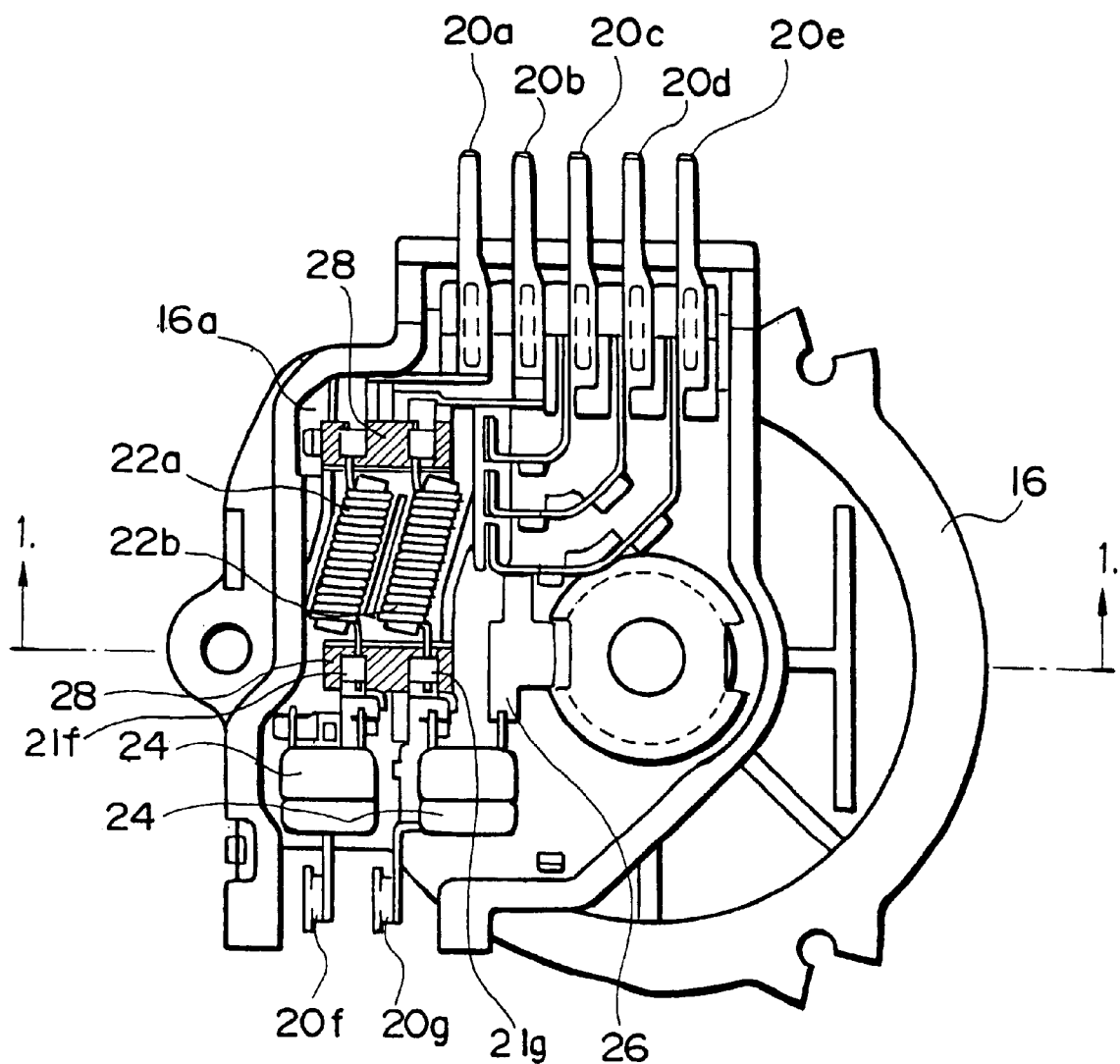
FIG. 2 is a plan view of the gear cover shown in FIG. 1, with the receiving cover being removed.

FIG. 1 is a plan view of an electric motor constructed according to the present invention. The electric motor 10 is adapted to drive a wiper (not shown) in the vehicle and comprises a main body 12 including an internal rotator and a speed reducer 14. The rotation of the internal rotator is slowed down and then transmitted to the wiper through a linkage. The speed reducer 14 includes a gear cover 16 covering a reduction gear and a receiving cover 18 mounted over the gear cover 16. FIG. 2 shows the gear cover 16 with the receiving cover 18 being removed.

As shown in FIG. 2, the gear cover 16 has a receiving portion 16a formed therein opposite to the reduction gear (not shown) for receiving connection plates 20a–20g, choke coils 22a, 22b, a capacitor 24 and an earth ground 26. The choke coils 22a, 22b and capacitor 24 are electric parts which are used to prevent noises due to sparks in the interior of the motor and may be replaced by any other means which can attain the same purpose. The choke coils 22a, 22b are formed by a spiral conductor coated with a plastic such as polyurethane.

More particularly, the connection plates include connection plates 20a–20e adapted to connect with external power source and switches and connection plates 20f and 20g adapted to connect with the internal parts of the motor. One of the choke coils 22a is connected between the connection plates 20a and 20f while the other choke coil 22b is connected between the connection plate 20b and 20g.

The gear cover 16 further includes openings 28 formed therethrough at positions corresponding to the respective connections between the choke coils 22a, 22b and the connection plates 20a, 20b, 20f, 20g. These openings 28 are continuous openings respectively corresponding to the juxtaposed choke coils 22a and 22b.

In FIG. 2, the openings 28 are shown being hatched. It is noted that such a hatching does not show any cross-section.

Figure 3:
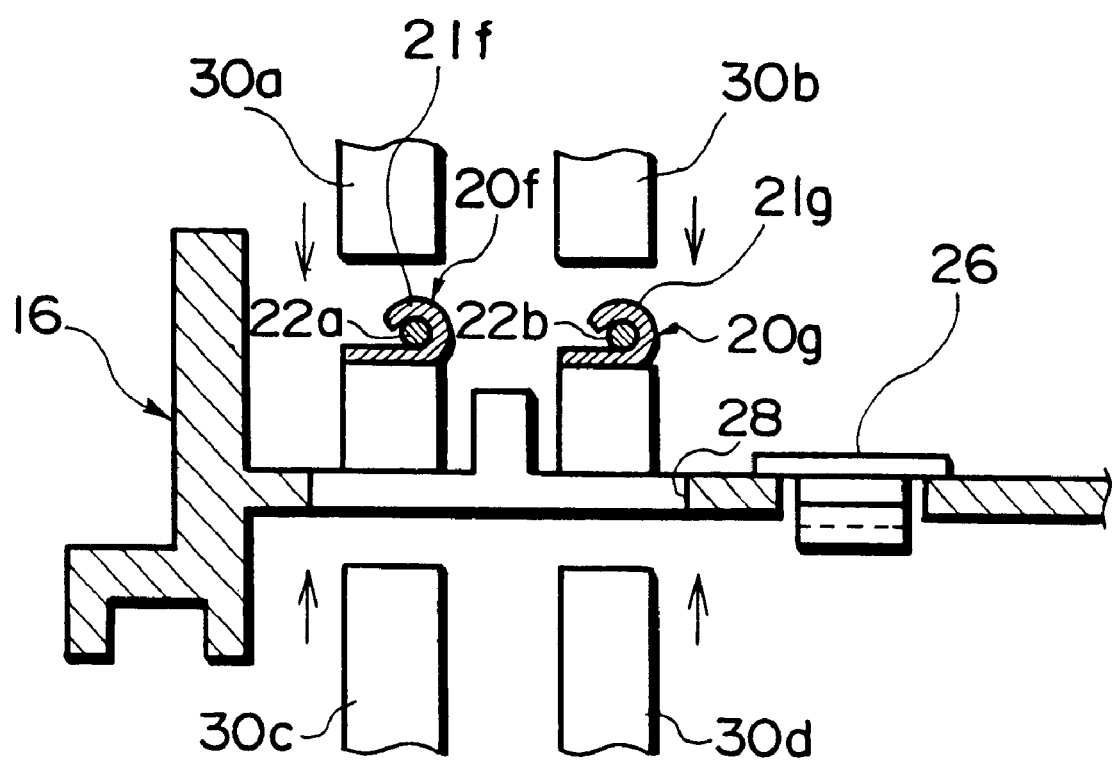
FIG. 3 is a cross-sectional view taken along a line A—A in FIG. 2, illustrating the connection procedure.

This embodiment is mostly characterized by that it provides a novel process of connecting between the choke coils 22a, 22b and the connection plates 20a–20g. FIG. 3 illustrates such a process by the cross-section taken along a line A—A in FIG. 2.

In FIG. 3, the connection portions 21f, 21g between the choke coils 22a, 22b and the connection plates 20f, 20g are disposed above the openings 28 in the gear cover 16.

On connection, pressure members 30a and 30b are first inserted into the respective openings 28 in the gear cover 16 while the other pressure members 30c and 30d are disposed opposite to the first mentioned pressure members 30a and 30b. The pressure members 30a–30d are then urged against one another to squeeze the choke coils 22a, 22b and connection portions 21f, 21g of connection plates 20f, 20g together. Thereafter, the pressure members 30a–30d are used as electrodes through which a high current will be flowed for a short time to weld the choke coils and connection plates through resistive heating.

Figure 4A:
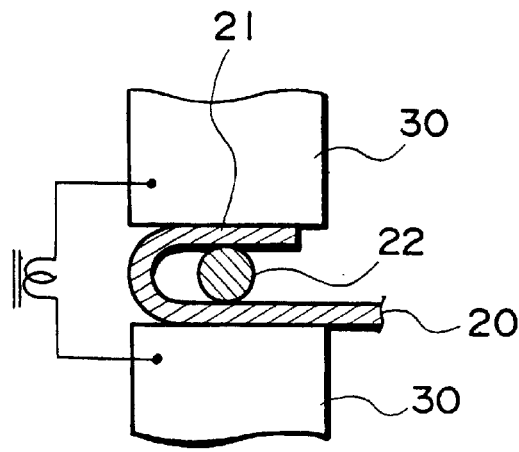
FIGS. 4A–4C illustrate steps of connecting a connection plate to an electric part.
Figure 4B:
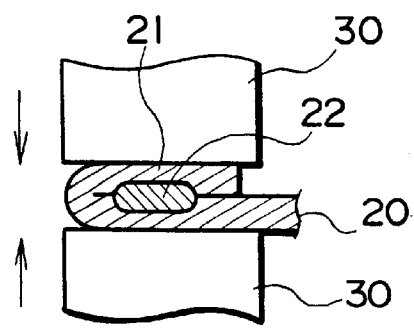
Figure 4C:
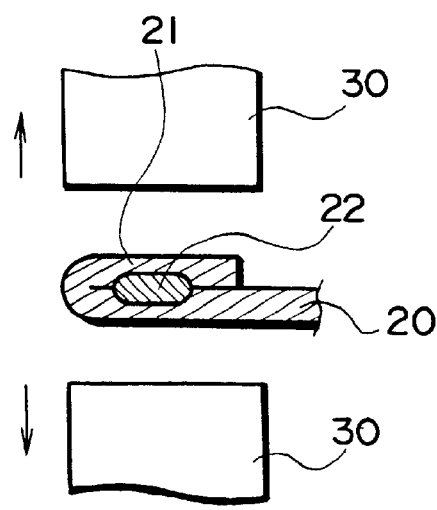

Such a connection process is schematically shown in FIGS. 4A–C in which the connection plate 20 has a connection portion 21 of U-shaped cross-section. The U-shaped connection portion 21 of the connection plate 20 receives the terminal of the corresponding choke coil 22 to be connected. As shown in FIG. 4A, the terminal of the choke coil 22 is first located within the U-shaped connection portion 21 of the connection plate 20 which is in turn squeezed by a pair of pressure members 30 moved against each other. During the squeezing step, a high current is flowed through the pressure members 30 for a short time. As shown in FIG. 4B, thus, the connection plate and choke coil 20, 22 will be deformed against each other and welded together through resistive heating.

Although the choke coil 22 has its conductor coated with the plastic as described, the plastic can be fused to provide an electric connection with the connection plate 20 by the resistive heating. The temperature in the resistive heating may not be equal to the welding temperature as far as it is at least equal to a temperature for fusing the plastic used therein since the minimum effect can be provided.

After the choke coil 22 has been welded and connected to the connection plate 20, the pressure members 30 are then moved away from one another. Thereafter, the pressure members 30a and 30b are drawn out from the respective openings 28 (see FIG. 3) to terminate the connection process.

The connection process of the present invention is suitable for automation since the choke coils 22 can be connected to the connection plates 20 after the connection plates 20 have been disposed within the receiving portion 16a of the gear cover 16.

Figure 5:
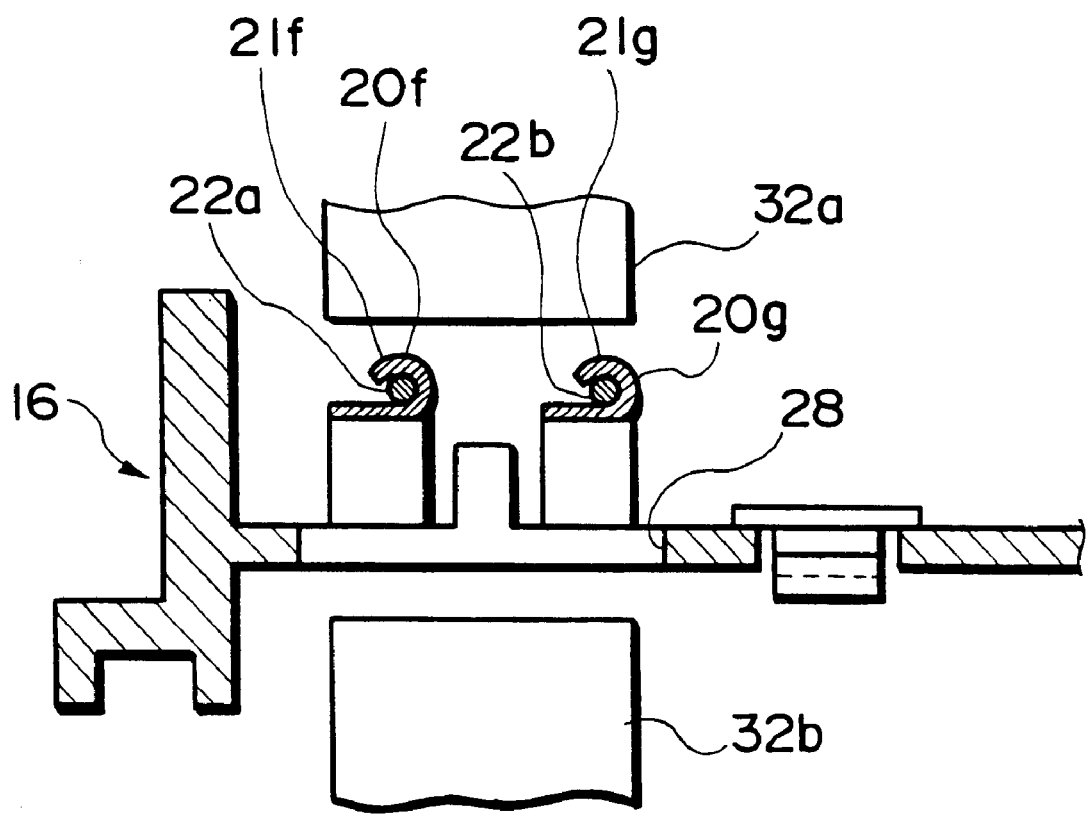
FIG. 5 is a plan view similar to FIG. 3, illustrating a modified embodiment of the present invention.

Although the embodiment of FIG. 3 has been described as to two pairs of pressure member 30a–30d for connecting two connection plates 20f, 20g to the respective choke coils 22a, 22b, the present invention may be applied to another form wherein a pair of larger pressure members 32a and 32b are used to connect two connection plates 20f, 20g with the respective choke coils 22a, 22b at the same time, as shown in FIG. 5. In such a case, the rigidity in the pressure members 32a, 32b can be increased with reduction of the temperature in the pressure members 32a, 32b themselves when a high current is flowed therethrough. It is of course that the larger pressure members 32a, 32b as shown in FIG. 5 require larger openings corresponding to the increased diameter of the pressure member 32a, 32b.

Figure 6A:
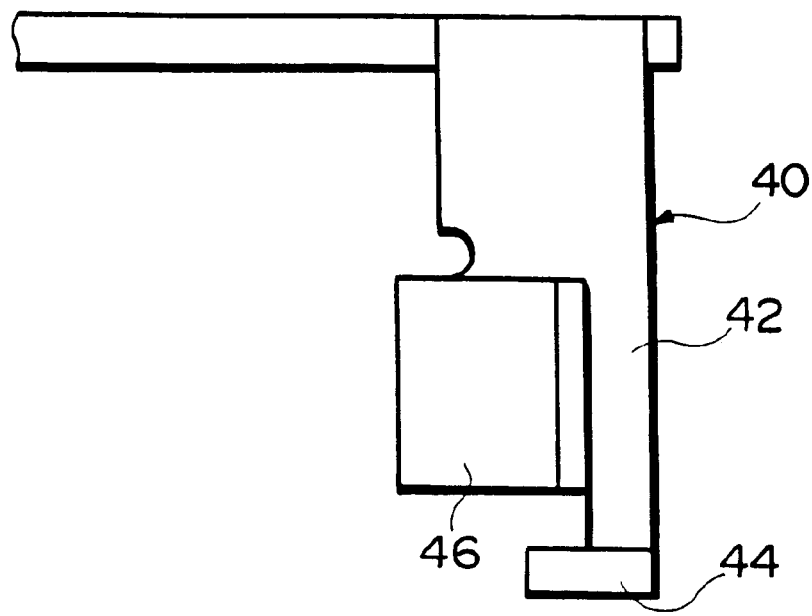
FIGS. 6A and 6B illustrate a modified connection plate.
Figure 6B:
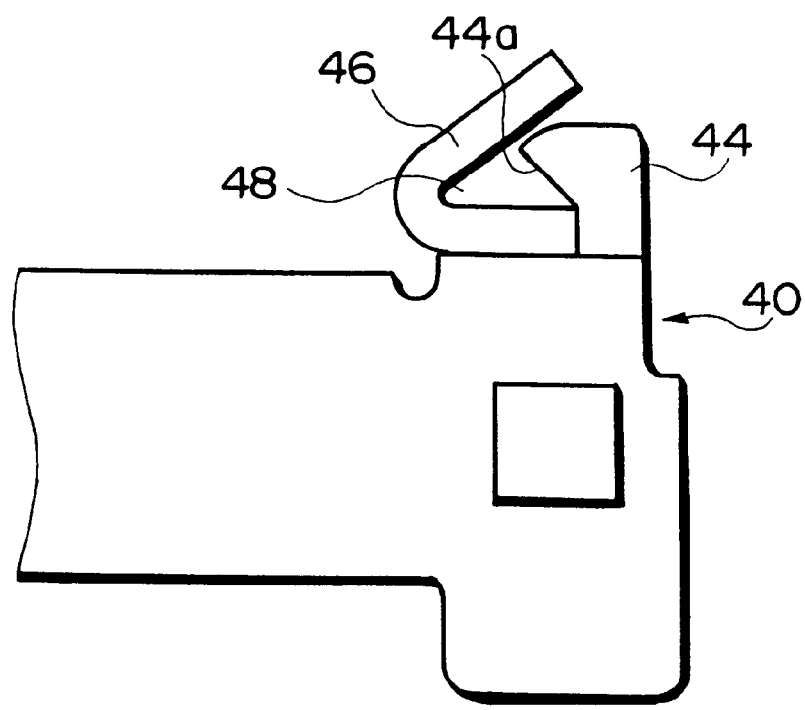

FIGS. 6A and 6B show a modified connection plate 40 which can temporarily hold the choke coils 22 prior to connection.

The connection plate 40 comprises an elongated plate portion 42 and a forward plate portion 44 attached to the forward end of the elongated plate portion 42. The elongated plate portion 42 has a side plate portion 46 formed therein on one side. The forward plate portion 44 is bent at right angle relative to the elongated plate portion 42 while the side plate portion is bent at an angle larger than 90 degrees relative to the elongated plate portion 42 to form a substantially C-shaped cross-section (see FIG. 6B). The forward plate portion 44 has a sloped end 44a formed therein adjacent the side plate portion 46, as shown in FIG. 6B. More particularly, the sloped end 44a forms an acute angle relative to the surface of the elongated plate portion 42 to form a triangular holding space 48 with the bottom of the side plate portion 46. The triangular space 48 receives the terminal of a choke coil 22 to be connected.

Figure 7A:
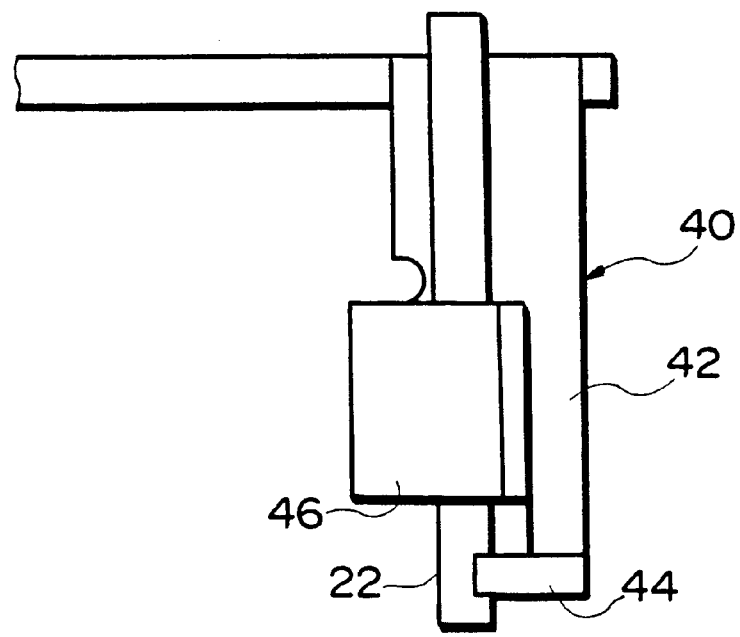
FIGS. 7A and 7B illustrate a choke coil being an electric part which is held by the connection plate shown in FIG. 6A and 6B.
Figure 7B:
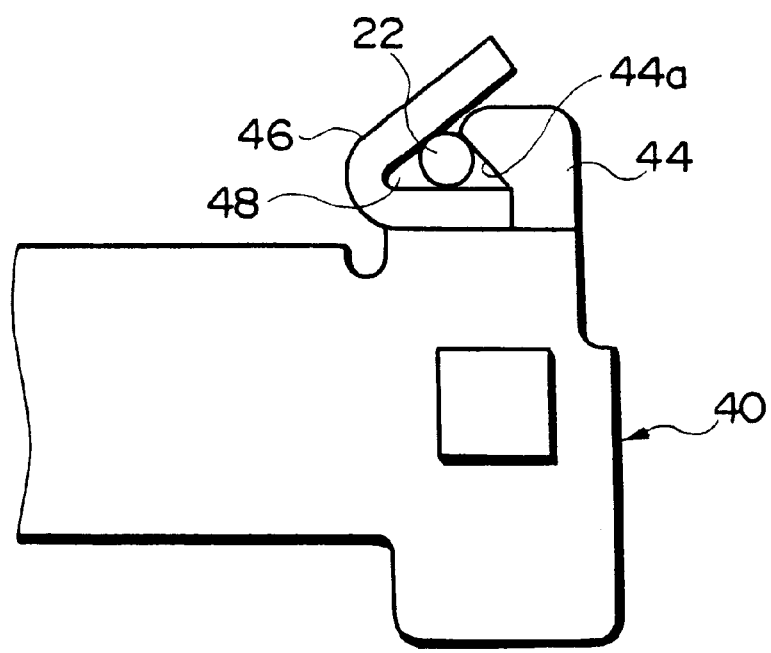

FIGS. 7A and 7B show the choke coil 22 held by the connection plate 40 shown in FIGS. 6A and 6B. As shown in FIG. 7B, the choke coil 22 is sandwiched and held within the triangular holding space 48 between the bottom of the side plate portion 46 and the sloped end 44a of the forward plate portion 44.

Such a holding step may simply be accomplished by inserting the terminal of the choke coil 22 into the holding space 48 below the side plate portion 46. Since the choke coil 22 can be temporarily held by the holding space 48 in the simple manner, the connection process can be smoothly carried out without disconnection of the choke coil 22 from the connection plate 40 when the pressure members are being moved (see FIGS. 3 through 5). The connection process can be more suitable for automation.

After the choke coils 22 have been connected to the connection plates 40 as described, the capacitor 24 is also connected to the connection plate 40. At this time, the connection of the capacitor 24 is accomplished by inserting it into a notch formed: in the connection plate 40, but may be carried out through such a process as shown in FIGS. 3 through 5.

After the electric parts have been housed within the receiving portion 16a (see FIG. 2), the gear cover 16 is mounted to cover the reduction gear (not shown) while the receiving cover 18 (see FIG. 1) is further mounted over the receiving portion 16a.

Since the electric motor 10 of this embodiment used to drive the wiper may be disposed at a position subjected to moisture such as rain or snow, it must have a waterproofness. The gear and receiving covers 16, 18 may be fluid-tightly mounted through packings (not shown). Alternatively, the gear cover may have a water proof labyrinth structure.

Since the gear cover 16 includes the openings 28 (see FIG. 2) formed therethrough, however, the space within the reduction gear will communicate with the space within the receiving portion 16a. This can provide an increased space which is more effective to cool the choke coils and capacitor 22, 24 received in the receiving portion 16a when they are heated. In addition, the tendency of producing a different pressure between the electric motor and the external atmosphere can be reduced to avoid a penetration of water into the electric motor if the air pressure within the electric motor becomes lower.

Figure 8A:
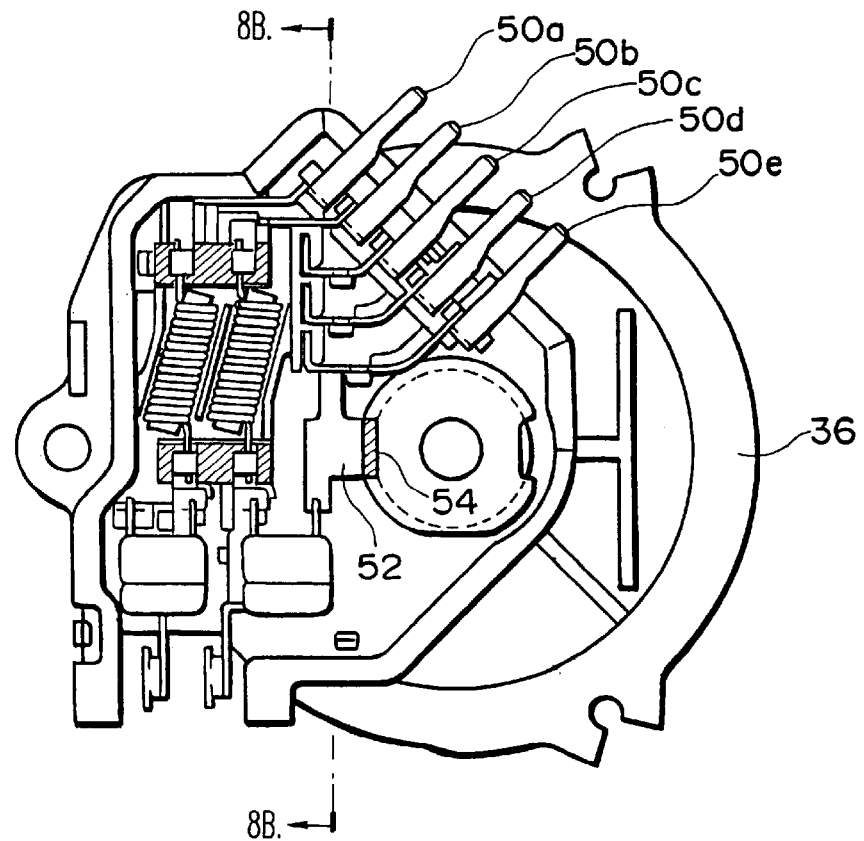
FIG. 8A is a plan view illustrating a modification of the gear cover shown in FIG. 2.
Figure 8B:
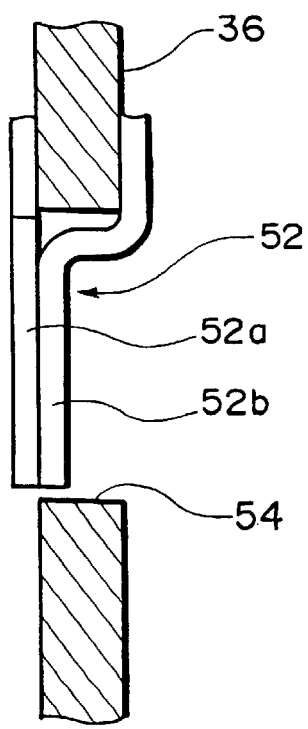
FIG. 8B is an enlarged view of the gear cover, partially broken along a line B—B in FIG. 8A.

FIGS. 8A and 8B show a modification of the above embodiment. In FIG. 8A, a gear cover 36 is different from that of the above embodiment only in that connection plates 50a–50e for power source or switch are slopingly disposed, unlike the arrangement of FIG. 2.

In FIG. 8A, the gear cover 36 includes an opening 54 formed therethrough in which an earth ground 52 is mounted. The earth ground 52 is similar to that of FIG. 2.

FIG. 8B is an enlarged view partially broken along a line B—B in FIG. 8A, illustrating the earth ground 52. In FIG. 8B, the opening 54 of the gear cover 36 receives an earth plate 52a at the outer edge thereof (left side as viewed in FIG. 8B) and another earth plate 52b behind the earth plate 52a (right side as viewed in FIG. 8B). These earth plates 52a, 52b are electrically connected to each other in surface contact. The earth plates 52a, 52b are integrally associated with each other to form an integral earth ground 52. However, only the earth plate 52b is only grounded.

Such a connection can be accomplished through such a process as described in connection with FIGS. 4A–C. More particularly, the earth plates 52a and 52b are sandwiched by the pressure members 30 (see FIGS. 4A–C). A high current is flowed through the pressure members 30 for a short time to weld the earth plates 52a and 52b through resistive heating.

Figure 9:
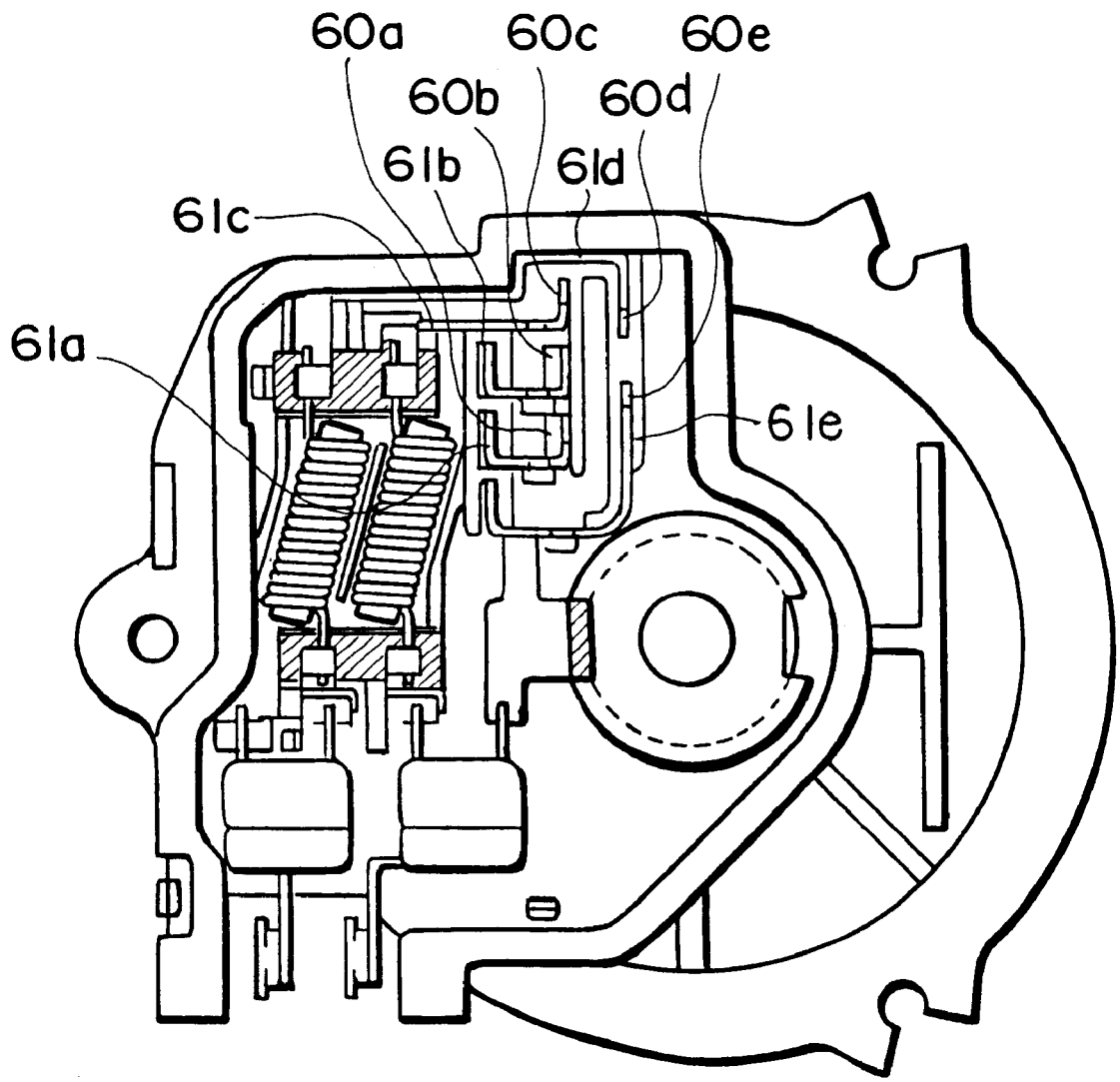
FIG. 9 is a plan view of a modification of the gear cover shown in FIG. 2.

The present invention is not limited to the aforementioned embodiments. For example, the present invention can provide another modification as shown in FIG. 9. The modification of FIG. 9 is different from those of FIG. 2 and FIGS. 8A and 8B only in that connection plates 61a–61e are bent upright. More particularly, the connection plates 61a–61e are bent upwardly along the plane of the drawing on the side of power source or switch (not shown) to form connectors 60a–60e. The other matters are similar to those of the aforementioned embodiments and will not further be described.

We claim:

1. A method of making an electric motor having a reduction gear and a gear cover detachably mounted thereon, comprising the steps of:

forming a receiving portion for receiving an electric part and a connection plate electrically connected to said electric part on the outer side of said gear cover, said connection plate having a connection portion to said electric part, said connection plate being open on one side which is covered by a removable receiving cover;

forming a opening through said gear cover at a location corresponding to said connection portion;

inserting one pressure member into said gear cover through said opening; and urging said one pressure member against another pressure member inserted from said one side with said receiving cover removed to squeeze said connection portion and connect said electric part to said connection plate.

2. A method of making an electric motor as defined in claim 1 by connecting said electric part to said connecting plate wherein said pressure members are used as electrodes through which an electric current is flowed for a given time period to heat said electric part and said connection plate through resistive heating.

3. A method of making an electric motor as defined in claim 2 wherein said connection plate has a holding portion for temporarily holding said electric part prior to squeezing and said connection portion is squeezed after said electric part has been held by said holding portion.

4. A method of making an electric motor as defined in claim 2 wherein said electric part and said connection plate are welded together through said resistive heating.

5. A method of making an electric motor as defined in claim 4 wherein said connection plate has a holding portion for temporarily holding said electric part prior to squeezing and said connection portion is squeezed after said electric part has been held by said holding portion.

6. A method of making an electric motor as defined in claim 4 wherein a plurality of said connection portions are provided and said opening is formed widely corresponding to said connection portions and said pressure members are provided to squeeze said connection portions at the same time and connect said electric part to said connection plate.

7. A method of making an electric motor as defined in claim 2 wherein a plurality of said connection portions are provided and said opening is formed widely corresponding to said connection portions and said pressure members are provided to squeeze said connection portions at the same time and connect said electric part to said connection plate.

8. A method of making an electric motor as defined in claim 1 wherein a plurality of said connection portions are provided and said opening is formed widely corresponding to said connection portions and said pressure members are provided to squeeze said connection portions at the same time and connect said electric part to said connection plate.

9. A method of making an electric motor as defined in claim 8 wherein said connection plate has a holding portion for temporarily holding said electric part prior to squeezing and said connection portion is squeezed after said electric part has been held by said holding portion.

10. A method of making an electric motor as defined in claim 1 wherein said connection plate has a holding portion for temporarily holding said electric part prior to squeezing and said connection portion is squeezed after said electric part has been held by said holding portion.

* * * * *